US012277957B1

(12) United States Patent
Guo et al.

(10) Patent No.: US 12,277,957 B1
(45) Date of Patent: Apr. 15, 2025

(54) DATA STORAGE DEVICE WITH EMBEDDED MODE HOP PREDICTOR PATTERNS

(71) Applicant: WESTERN DIGITAL TECHNOLOGIES, INC., San Jose, CA (US)

(72) Inventors: Guoxiao Guo, Irvine, CA (US); Kei Yasuna, Kanagawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/386,326

(22) Filed: Nov. 2, 2023

(51) Int. Cl.
| | |
|---|---|
| G11B 5/596 | (2006.01) |
| G11B 7/1263 | (2012.01) |
| G11B 13/04 | (2006.01) |
| G11B 27/36 | (2006.01) |
| G11B 5/00 | (2006.01) |
| G11B 7/09 | (2006.01) |

(52) U.S. Cl.
CPC ........ *G11B 5/59688* (2013.01); *G11B 7/1263* (2013.01); *G11B 13/045* (2013.01); *G11B 27/36* (2013.01); *G11B 2005/0018* (2013.01); *G11B 2005/0021* (2013.01); *G11B 7/0938* (2013.01); *G11B 2220/2516* (2013.01)

(58) Field of Classification Search
CPC . G11B 5/59688; G11B 7/1263; G11B 13/045; G11B 27/36; G11B 7/0938; G11B 2005/0018; G11B 2005/0021; G11B 2220/2516
See application file for complete search history.

(56) References Cited

U.S. PATENT DOCUMENTS

| | | |
|---|---|---|
| 5,793,559 A | 8/1998 | Shepherd et al. |
| 6,324,030 B1 | 11/2001 | Cheung et al. |
| 6,977,792 B1 | 12/2005 | Melrose et al. |
| 7,576,942 B1 | 8/2009 | Karns et al. |
| 7,619,841 B1 | 11/2009 | Kupferman |

(Continued)

FOREIGN PATENT DOCUMENTS

| | | |
|---|---|---|
| JP | 2001014816 A | 1/2001 |
| JP | 2012079402 A | 4/2012 |
| WO | WO1997032301 A1 | 9/1997 |

OTHER PUBLICATIONS

Ma Kun; Servo Pattern Enhancements for High Areal Density Hard Disk Drives; School of Electrical & Electronic Engineering A thesis submitted to the Nanyang Technological University in partial fullment of the requirements for the degree of Doctor of Philosophy 2017; 174 pages https://dr.ntu.edu.sg/bitstream/10356/72656/1/SERVO%20PATTERN%20ENHANCEMENTS%20FOR%20HIGH%20AREAL%20DENSITY%20HARD%20DISK%20DRIVES.pdf.

(Continued)

*Primary Examiner* — Andrew Sasinowski

(74) *Attorney, Agent, or Firm* — Calderon Safran & Wright P.C.

(57) ABSTRACT

Various illustrative aspects are directed to a data storage device, method, and one or more processing devices that are configured to: write a plurality of test servo patterns using a plurality of different write settings; select one of the plurality of different write settings based on analyzing the plurality of test servo patterns for mode hop; and write a plurality of final servo patterns using the selected one of the plurality of different write settings.

20 Claims, 11 Drawing Sheets

(56) References Cited

U.S. PATENT DOCUMENTS

| | | |
|---|---|---|
| 7,898,762 B1 | 3/2011 | Guo et al. |
| 8,355,300 B2 | 1/2013 | Grobis et al. |
| 8,711,504 B1 | 4/2014 | Everett et al. |
| 8,767,327 B1 | 7/2014 | Saito et al. |
| 8,792,200 B1 | 7/2014 | Tam et al. |
| 9,053,728 B1 | 6/2015 | French, Jr. |
| 9,245,560 B1 | 1/2016 | Nie et al. |
| 9,384,774 B1 | 7/2016 | Nookala et al. |
| 9,595,288 B1 | 3/2017 | Chu et al. |
| 9,626,989 B1 | 4/2017 | Buch et al. |
| 9,818,447 B1 | 11/2017 | Zheng et al. |
| 9,888,077 B2 * | 2/2018 | Squires ............ H04L 65/762 |
| 9,972,344 B2 | 5/2018 | Ruan et al. |
| 9,979,573 B1 | 5/2018 | Marrow et al. |
| 9,984,719 B2 | 5/2018 | Matousek et al. |
| 10,296,232 B2 * | 5/2019 | Dunn ............ G06F 3/0625 |
| 10,360,930 B1 | 7/2019 | Asakura et al. |
| 10,720,177 B1 | 7/2020 | Ng et al. |
| 10,770,106 B1 | 9/2020 | Mader et al. |
| 10,783,912 B1 | 9/2020 | Tu et al. |
| 10,997,997 B1 * | 5/2021 | Xiong ............ G11B 7/1267 |
| 11,037,590 B2 * | 6/2021 | Nguyen ............ G11B 5/582 |
| 11,200,912 B1 | 12/2021 | Guo et al. |
| 11,450,346 B2 | 9/2022 | Tatah et al. |
| 11,830,524 B1 | 11/2023 | Yasuna et al. |
| 12,100,431 B1 | 9/2024 | Huang et al. |
| 2005/0128634 A1 | 6/2005 | Schmidt |
| 2006/0215306 A1 | 9/2006 | Ehrlich et al. |
| 2007/0002487 A1 | 1/2007 | Langlois et al. |
| 2008/0266701 A1 | 10/2008 | Albrecht et al. |
| 2013/0010384 A1 | 1/2013 | Nonaka et al. |
| 2018/0130494 A1 * | 5/2018 | Chatradhi ............ G11B 5/455 |
| 2020/0381016 A1 | 12/2020 | Liu et al. |

OTHER PUBLICATIONS

Guo et al., "Servo detection and control considering servo pattern defects"; Conference Paper, APMRC, Jan. 2012; ResearchGate; 3 pages.

Notice of Allowance in U.S. Appl. No. 18/384,051 dated Jul. 10, 2024; 11 pages.

* cited by examiner

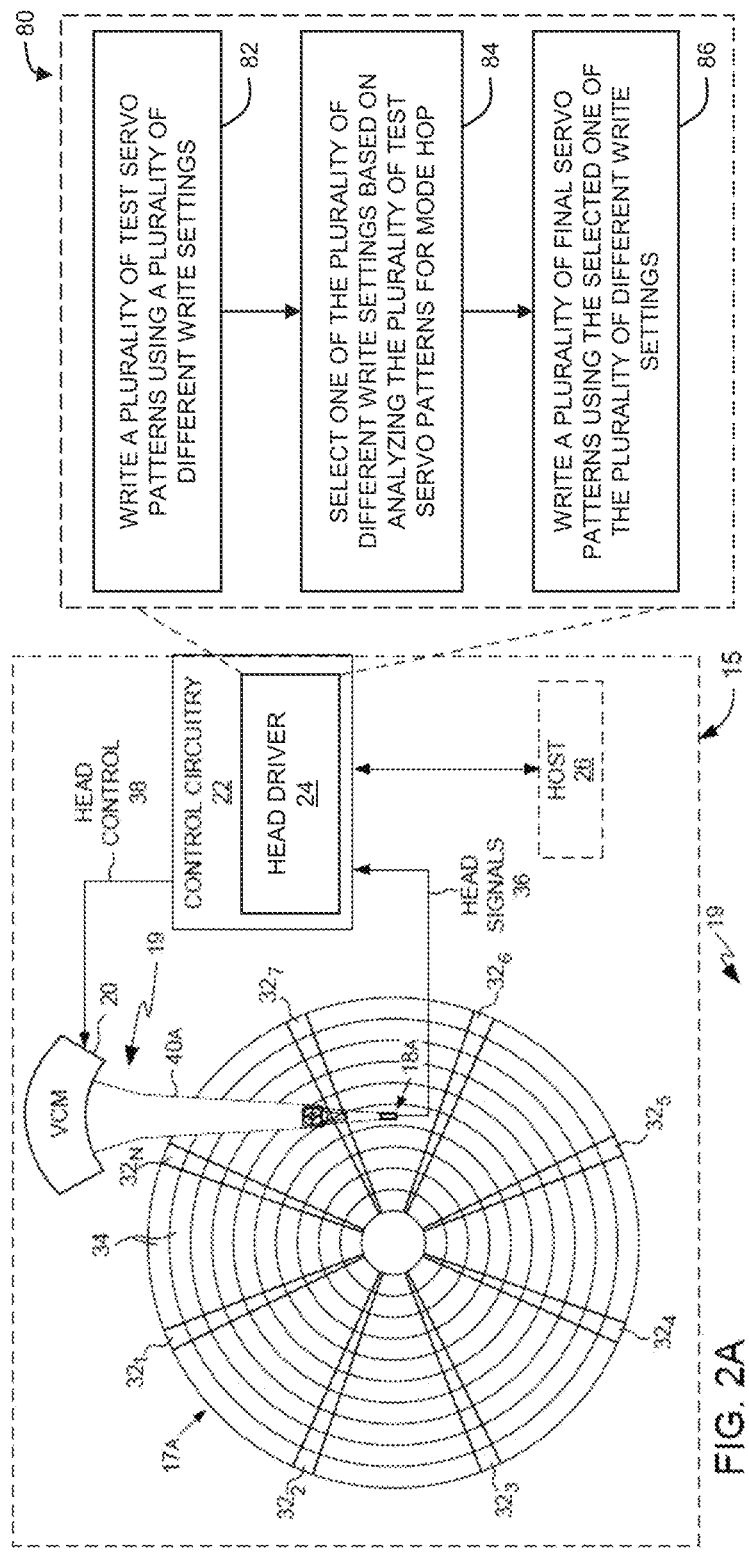
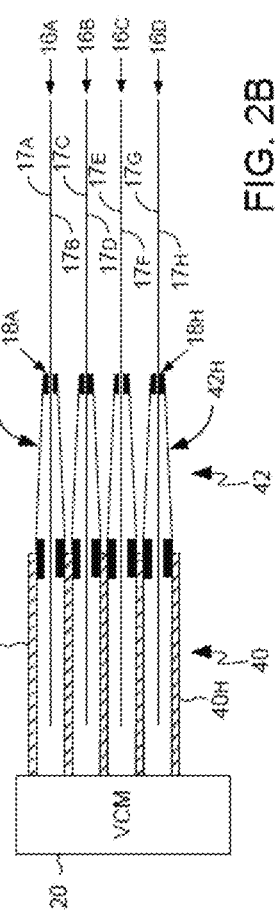
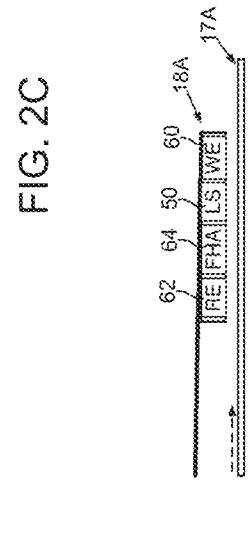
FIG. 2A
FIG. 2B
FIG. 2C
FIG. 2D

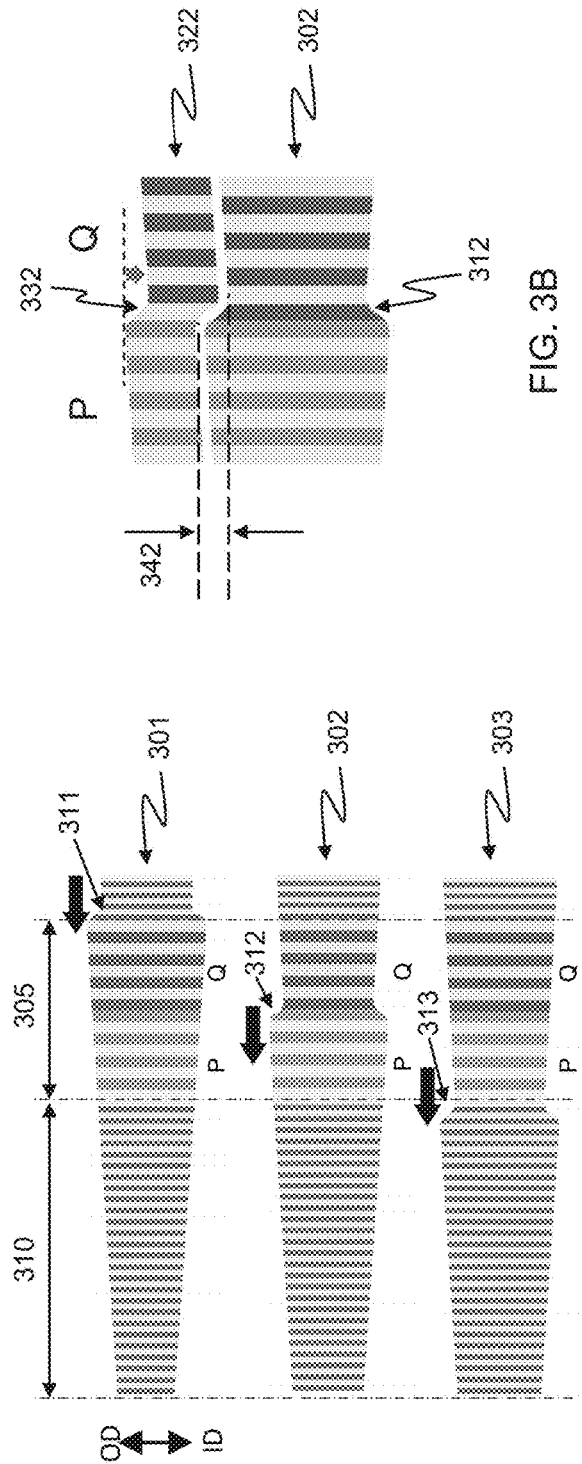
FIG. 3A
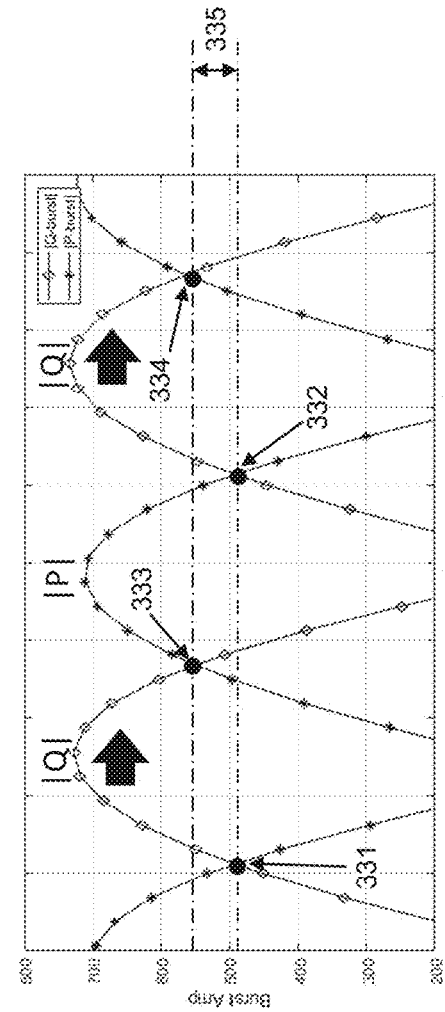
FIG. 3B
FIG. 3C

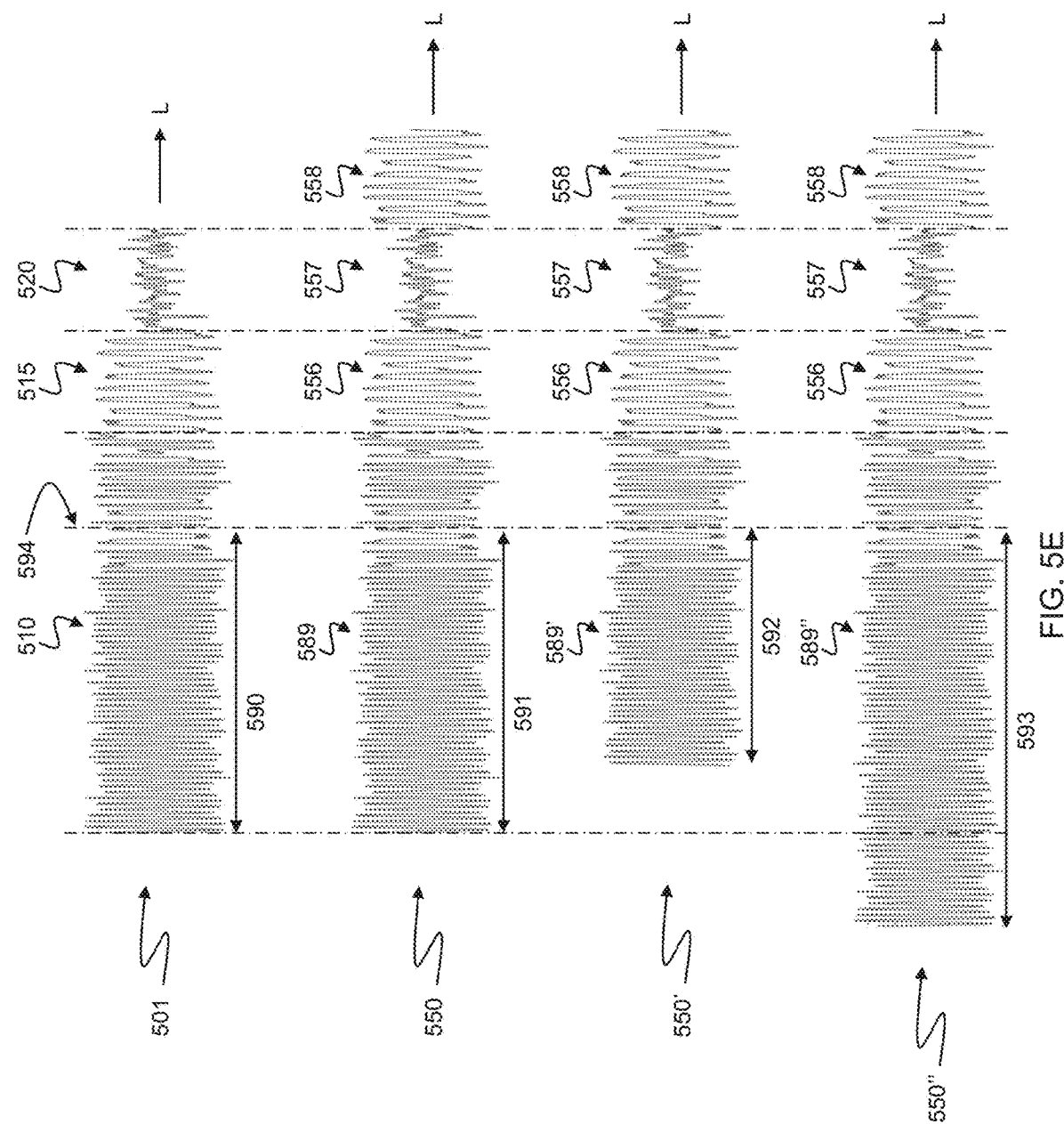

DATA STORAGE DEVICE WITH EMBEDDED MODE HOP PREDICTOR PATTERNS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., P and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in a dual stage actuator or a triple stage actuator, in some examples.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a technique that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Since the quality of the write/read signal depends on the fly height of the head, conventional heads may also comprise an actuator for controlling the fly height. Any suitable fly height actuator (FHA) may be employed, such as a heater which controls fly height through thermal expansion, or a piezoelectric (PZT) actuator that actuates through mechanical deflection.

SUMMARY

Various examples disclosed herein are directed to systems and methods that help reduce servo pattern distortion caused by laser mode hopping that occurs with the use of HAMR laser systems in hard disk drives. Implementations of the present disclosure use mode hop analysis of test servo patterns to select write settings that minimize the occurrence or degree of mode hop induced distortion in the burst pattern of final servo patterns. In this manner, implementations help reduce servo pattern distortion caused by laser mode hopping and, thus, help reduce the occurrence of DC squeeze that can result from laser mode hopping.

Various illustrative aspects are directed to a data storage device comprising: one or more disks; an actuating mechanism comprising one or more heads, and configured to position the one or more heads proximate to disk surfaces of the one or more disks; and one or more processing devices. The one or more processing devices, individually or in combination, are configured to: write a plurality of test servo patterns using a plurality of different write settings; select one of the plurality of different write settings based on analyzing the plurality of test servo patterns for mode hop; and write a plurality of final servo patterns using the selected one of the plurality of different write settings.

Various illustrative aspects are directed to a method comprising: writing a plurality of test servo patterns in a track of a disk using a plurality of different write settings; analyzing the plurality of test servo patterns for mode hop; selecting one of the plurality of different write settings based on the analyzing the plurality of test servo patterns for mode hop; and writing a plurality of final servo patterns in servo sectors in multiple tracks of the disk using the selected one of the plurality of different write settings. In embodiments, the writing the plurality of test servo patterns, the analyzing the plurality of test servo patterns, the selecting one of the plurality of different write settings, and the writing the plurality of final servo patterns are performed by one or more processing devices individually or in combination.

Various illustrative aspects are directed to one or more processing devices comprising: means for writing a plurality of test servo patterns in a track of a disk using a plurality of different write settings; means for selecting one of the plurality of different write settings based on analyzing the plurality of test servo patterns for mode hop; and means for writing a plurality of final servo patterns in servo sectors in multiple tracks of the disk using the selected one of the plurality of different write settings.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that control circuitry of a disk drive may perform or execute in controlling the operations of the disk drive, including operations of servo pattern writing, in accordance with aspects of the present disclosure.

FIG. 2D depicts a read/write head including a laser unit, in accordance with aspects of the present disclosure.

FIGS. 3A-3C depict the mechanism of DC bi-modal distortion caused by laser mode hopping.

FIG. 5E shows an example of writing a plurality of different instances of one of the implementations of a test servo pattern with different length preambles in accordance with aspects of the present disclosure.

DETAILED DESCRIPTION

Figure 1:
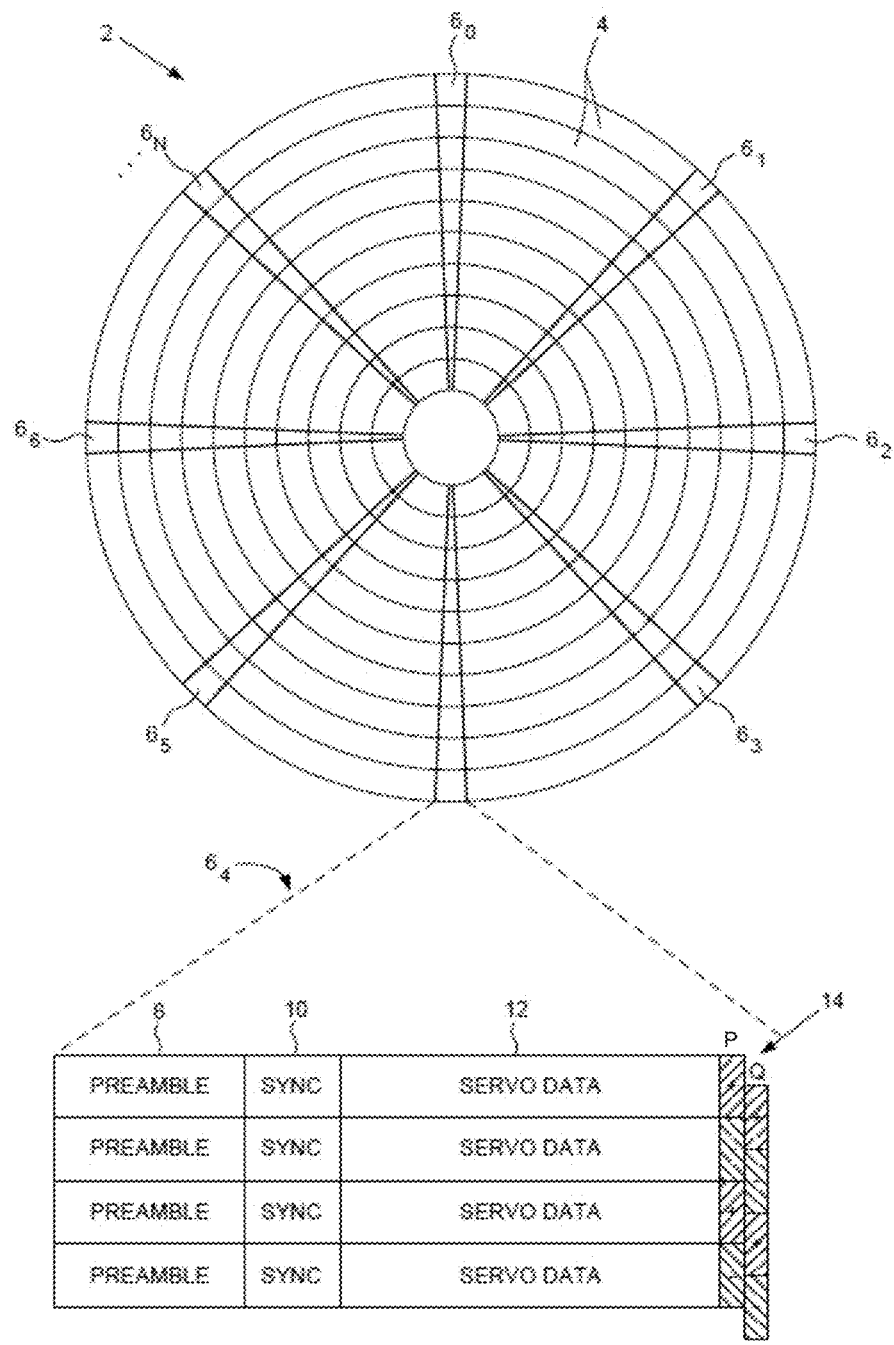
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that head driver 24 of control circuitry 22 of disk drive 15 may perform or execute in controlling the operations of disk drive 15, including the operations of head position adjustment in accordance with aspects of the present disclosure.

Actuator arm assembly 19 comprises a primary actuator, e.g., a voice coil motor 20 ("VCM 20") and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more auxiliary actuators or fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices, and one or more modules. Such device drivers may comprise one or more head drivers 24, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Example disk drive 15 of FIGS. 2A and 2B comprises four hard disks 16. Other examples may comprise any number of disks, such as one disk, two disks, three disks, or five or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. VCM 20 may perform primary, macroscopic actuation of a plurality of actuator arms 40, each of which may suspend one of heads 18, e.g., head 18A, over and proximate to corresponding disk surfaces of disks 16. The position of heads 18, e.g., head 18A, are indicated in FIG. 2A, and are generally positioned very close to disk surfaces 17, although heads 18 are too small to be visible if depicted to scale in FIGS. 2A and 2B. Actuator arm assembly 19 suspends each of heads 18 of each actuator arm 40 over and proximate to a corresponding disk surface 17, enabling each head 18 to write control features and data to, and read control features and data from, its respective, proximate disk surface 17. In this sense, each head 18 of each actuator arm 40 interacts with a corresponding disk surface 17. Each head 18 writes to and reads from its corresponding disk surface 17 under the positioning control of the actuators of actuator arm assembly 19, comprising VCM 20, in this example, and potentially additional fine actuators, which may be controlled by control circuitry 22, in various examples.

FIG. 2D depicts an expanded view of head 18A including a laser unit 50 in a HAMR system, in accordance with aspects of the present disclosure. In the embodiment of FIG.

2D, head 18A comprises a laser unit 50 configured to heat the disk surface, a write element 60 (e.g., an inductive coil), a read element 62 (e.g., a magnetoresistive element), and a fly height actuator (FHA) 64 configured to actuate head 18A vertically over disk surface 17A. Any suitable FHA 64 may be employed, such as a thermal fly height control (TFC) element that actuates through thermal expansion, or a piezoelectric actuator that actuates through mechanical deflection. Head 18A may also comprise other optical components associated with laser unit 50, such as a waveguide and a near field transducer (NFT) configured to use a laser emitted by laser unit 50 to project a plasmon onto disk surface 17A to heat an area of disk surface 17A to be written to with write element 60. The arrangement or disposition of elements of heads 18 described herein is not limited to any specific detail as shown in FIG. 2D, and the elements of heads 18 may be arranged in any of a variety of other configurations in other examples.

The term "disk surface" may be understood to have the ordinary meaning it has to persons skilled in the applicable engineering fields of art. The term "disk surface" may be understood to comprise both the very outer surface layer of a disk drive as well as a volume of disk drive matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A, 2B, and 2D, each disk surface 17, e.g., disk surface 17A as shown in FIG. 2A, comprises a plurality of control features. The control features comprise servo wedges $32_1$-$32_N$ (collectively, servo wedges 32), which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate servo information written in servo wedges $32_1$-$32_N$ and generate a position error signal (PES) representing an error between the actual position of the head and a target position relative to a target track. A servo control system in control circuitry 22 filters the PES derived from the servo wedges using a suitable compensation filter to generate a control signal 38 applied to actuator arm assembly 19, including to control VCM 20, which rotates actuator arm assembly 19 about an axial pivot in order to perform primary actuation of the corresponding heads 18 radially over the disk surfaces 17 in a direction that reduces the PES, as well as to control any fine actuators, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. These may all be examples of an actuating mechanism comprising one or more heads 18, and configured to position the one or more heads 18 proximate to disk surfaces 17 of the one or more disks 16, in accordance with various examples of this disclosure.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, control circuitry 22 may write a plurality of test servo patterns using a plurality of different write settings (82). Control circuitry 22 may further select one of the plurality of different write settings based on analyzing the plurality of test servo patterns for mode hop (84). Control circuitry 22 may further write a plurality of final servo patterns using the selected one of the plurality of different write settings (86).

Referring again to head 18A of a HAMR disk drive as shown in FIG. 2D, when control circuitry 22 is applying current (or power in any form) to laser unit 50 during write operations, laser unit 50 may exhibit sudden and unpredictable changes between two or more available modes in which it emits a laser, due to the inherent physics of laser emission, which cause transients, or sudden shifts in magnitude, in output power of the laser being emitted by laser unit 50. This phenomenon is known as "mode hopping." Because such laser mode hopping can create sudden, unpredictable changes in the laser power, laser mode hopping may also cause sudden, unpredictable write width changes, even while the write current applied to write element 60 remains constant. That is, a greater or lesser width across disk surface 17 may be susceptible to the constant write current in response to the laser suddenly becoming more or less powerful, respectively. When such changes in write width are applied during servo write, laser mode hopping may therefore cause distortion of servo patterns in a servo wedge 32. Such distortion of the servo patterns may be referred to as DC bi-modal distortion, or simply as "DC bi-modal," and may result in degraded operational issues of disk drive 15 such as DC squeeze (also called track squeeze) and/or large repeatable runout (RRO) error. Laser mode hopping is thus an undesirable characteristic of HAMR systems and has proven difficult to eliminate. Accordingly, aspects of the present disclosure are directed to systems and methods that mitigate the impact of servo pattern distortion caused by laser mode hopping, among other advantages.

FIGS. 3A-3C depict illustrative examples of the mechanism of DC bi-modal distortion caused by laser mode hopping. FIG. 3A depicts examples of elemental servo patterns generated at a servo writing process. Elemental servo patterns 301, 302, 303 illustrate three example cases that each has write width change while writing a single servo wedge. Each of elemental servo patterns 301, 302, 303 comprises a block 310 and a block 305. Block 310 in each of elemental servo patterns 301, 302, 303 is comprised of preamble, servo address mark (SAM) or servo index mark (SIM), and gray coded track information. Block 305 in each of elemental servo patterns 301, 302, 303 comprises a Q burst and a P burst, which together form a null burst pattern or simply burst pattern. In the servo writing process, control circuitry 22 may write elemental servo pattern 302 overlapped with a previous elemental servo pattern 322 by adding a half-track radial offset, as shown in FIG. 3B. Control circuitry 22 may iterate this write and move operation to form a servo wedge, e.g., servo wedges 32 in FIG. 2A, across the stroke on a disk surface 17.

FIG. 3A depicts sudden, unpredicted write width change patterns 311, 312, 313 caused by laser mode hop as described herein, in elemental servo patterns 301, 302, 303, respectively. The slowly increasing trend over time (i.e., left to right) of write width of elemental servo patterns 301, 302, 303 is attributed to regular write transient due to ramp-up of laser power. The occurrence of the mode hop-induced write width change is not completely random when writing servo wedges. In most cases, the write width changes like write width change patterns 311, 312, 313 show up at almost the same down-track location of every wedge while writing a few thousands of tracks. As the process goes further over time and as servo writing proceeds radially across disk surface 17, the down-track location of write width change pattern 311 may gradually shift to the locations of write width change patterns 312 and/or 313. As a null burst pattern is formed by stitching polarity flipped patterns, a case when the write width change overlaps the burst area as shown in elemental servo pattern 302 and write width change pattern 312 has greater impact on servo positioning operation of disk drive 15, relative to cases in which a write width change lies outside of the burst area, as in write width change patterns 311 and 313.

FIG. 3B shows a magnified view of the distortion of the Q burst and the P burst caused by the write width change pattern 312 overlapping the null burst pattern of elemental servo pattern 302 as shown in FIG. 3A, which is subsequently written adjacent to and partially overlapping elemental servo pattern 322 having a similarly distorted write width change pattern 332 between that track's Q burst and P burst. As shown in FIG. 3B, when write width change patterns 312, 332 overlap the null burst patterns, a burst transition edge may be consistently radially shifted relative to adjacent null burst patterns in adjacent elemental servo patterns 302, 322. In the example shown in FIG. 3B, the Q burst is radially shifted by the distortion caused by write width changes such as Q burst write width change patterns 312 or 332. As a result, the pattern edge of the Q burst is shifted from its nominal position, creating the radial location difference 342 in the Q burst when the burst changes polarity. A write width change when the burst is not changing polarity affects the erase band position. Because the erase band is typically small compared with the track pitch, a position change affecting the erase band typically has a very small effect on the burst profile and, consequently, PES detection.

FIG. 3C shows an exemplary cross track profile of servo burst signals of the Q burst and the P burst that result from the distortion of the null burst patterns as depicted in FIG. 3B. In the example shown in FIG. 3C, the Q burst edge is placed on the inner diameter (ID) side relative to the P burst edge by the shift amount 342. As shown in FIG. 3C, due to the radially shifted profile of one burst relative to the other burst, the amplitude of the crossing levels 331, 332 at the integer locations differs from the amplitude of the crossing levels 333, 334 at the half-integer locations, as indicated by delta 335. This cross-point split (also referred to as DC bi-modal herein) results from laser mode hop occurring during writing of the null burst pattern and leads to distortion of fractional servo pattern track position scale as well as undesirable DC track misregistration. Delta 335 having a magnitude of zero indicates that mode hop did not occur in the region corresponding to the pair of bursts in the null burst pattern. Delta 335 having a magnitude of greater than zero indicates that mode hop occurred in the region corresponding to the pair of bursts in the null burst pattern. The greater the magnitude of delta 335, the greater the degree of DC bi-modal and the greater the detrimental effect resulting from the mode hop. In this manner, control circuitry 22 may detect whether mode hop occurred in a region corresponding to a pair of bursts in a null burst pattern and may determine a relative magnitude of the effect of the mode hop. Detecting mode hop using this technique is referred to herein as DC bi-modal analysis.

Figure 4:
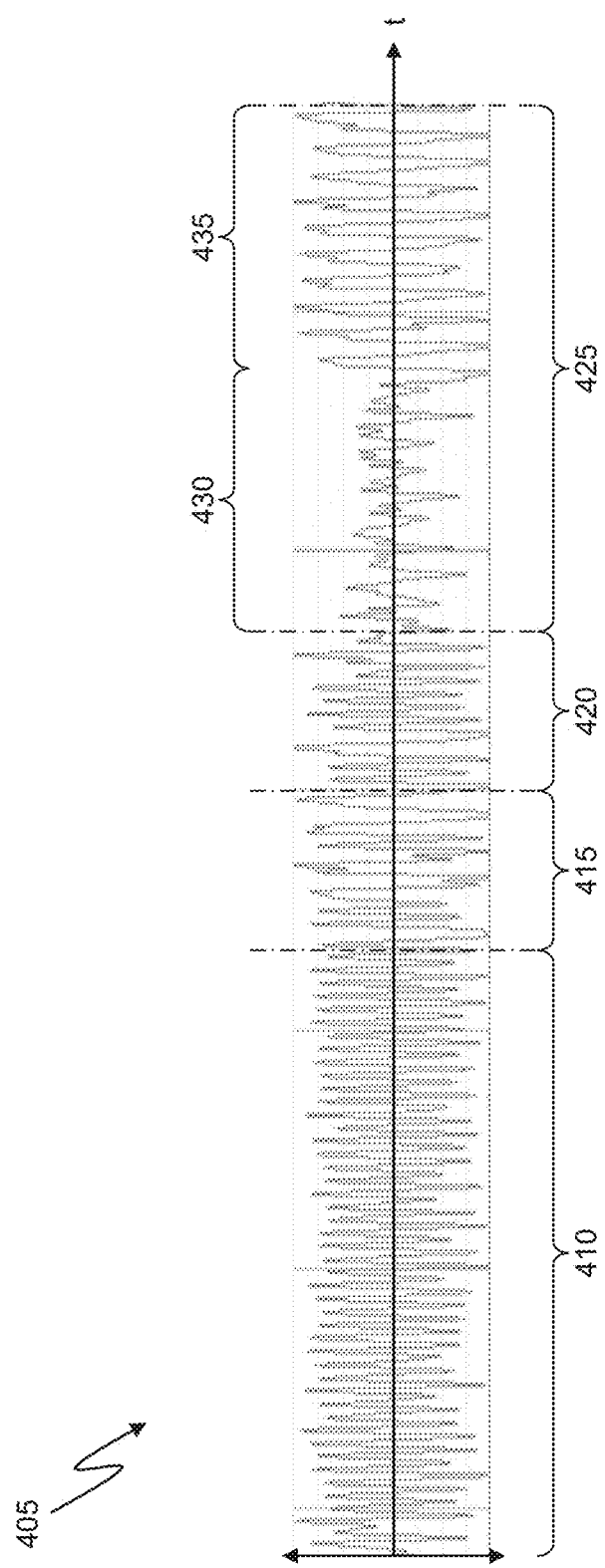
FIG. 4 shows a waveform of an exemplary servo pattern that may represent a servo pattern included in a servo wedge of a servo track of a disk.

FIG. 4 shows a waveform 405 of an exemplary servo pattern that may represent a servo pattern included in a servo wedge of a servo track of a disk. Waveform 405 is shown relative to time axis "t", which can be correlated to positions along a track in a circumferential direction of the disk surface. As shown in waveform 405, the servo pattern may include servo information corresponding to a preamble 410, other servo information 415 such as servo index marks (SIM) or servo address marks (SAM), gray coded track address information 420 representing the address of the corresponding servo track, and a burst pattern 425 comprising a P burst 430 and a Q burst 435. Preamble 410, other servo information 415, and gray coded track address information 420 collectively may correspond to block 310 of elemental servo patterns of FIG. 3. Burst pattern 425 comprising P burst 430 and Q burst 435 may correspond to block 305 of elemental servo patterns of FIG. 3. Mode hop is particularly problematic when it occurs in the region of burst pattern 425. This is because distortion of burst pattern 425, caused by mode hop occurring during writing of burst pattern 425, can result in track misregistration during track following, which can produce errors when reading data from, or writing data to, a data sector following the servo wedge containing the servo pattern.

Mode hop detection systems that measure a temperature of the laser (e.g., laser unit 50 of FIG. 2D) during writing are ineffective in detecting mode hope during writing of burst pattern 425. This is because temperature sensors used in such systems have time constants that are larger than the time involved in writing burst pattern 425 and, thus, cannot accurately detect a temperature change that occurs in the relatively short amount of time associated with writing burst pattern 425. For example, a typical burst pattern, such as burst pattern 425, has a time length of between 0.1 and 0.2 microseconds, which is too small a time to accurately detect a mode hop related temperature change of a laser in a head of a HAMR disk drive.

Implementations of the present disclosure address the problem of burst pattern distortion caused by laser mode hop occurrence during the writing of a servo pattern, as described in FIGS. 3A-C and 4, by: writing a plurality of test servo patterns using a plurality of different write settings; selecting one of the plurality of different write settings based on analyzing the plurality of test servo patterns for mode hop; and writing a plurality of final servo patterns using the selected one of the plurality of different write settings. By analyzing the plurality of test servo patterns for the occurrence of mode hop, control circuitry 22 may determine and select write settings that minimize the occurrence or degree of mode hop induced distortion in the burst pattern of the final servo patterns. Control circuitry 22 may use the selected write settings when writing final servo patterns in servo wedges of the disk.

In embodiments, the final servo patterns written using the selected write settings constitute product servo patterns that are written in the servo wedges and used for track registration when reading data from and/or writing data to the disk. In some embodiments, the test servo patterns are sacrificial and not used for track registration when reading data from and/or writing data to the disk. For example, in various embodiments, the test servo patterns are written in data sectors of the disk and may be subsequently overwritten by data. In various other embodiments, the test servo patterns are written in servo wedges of the disk and may be subsequently overwritten by the final servo patterns. In some embodiments, some or all of a test servo pattern is not sacrificial, and the test servo pattern is written in a servo wedge and used for track registration when reading data from and/or writing data to the disk.

In various embodiments, the test servo patterns have a length that is greater than a length of the final servo patterns, the length being measured in a longitudinal (e.g., circumferential) direction of a track containing the servo patterns. For example, the test servo patterns may include a number of bursts that is greater than a number of bursts in the final servo patterns. In this manner, control circuitry 22 may analyze the test servo patterns for mode hop in a region that corresponds to the burst pattern in the final servo patterns as well as in regions that are adjacent to, but not in, the region that corresponds to the burst pattern in the final servo patterns. In some embodiments, the test servo patterns may have a same length as the final servo patterns.

In embodiments, the different write settings used to write the plurality of test servo patterns include different levels of current supplied to the laser (e.g., laser unit 50) during writing of the test servo patterns, different lengths of preamble written in the test servo patterns, or both. For example, control circuitry 22 may write a first one of the test servo patterns using a first level of laser current, a second one of the test servo patterns using a second level of laser current that is greater than the first level of laser current, and a third one of the test servo patterns using a third level of laser current that is greater than the second level of laser current. In another example, control circuitry 22 may write a first one of the test servo patterns with a preamble having a first length, a second one of the test servo patterns with a preamble having a second length greater than the first length, and a third one of the test servo patterns with a preamble having a third length greater than the second length. In another example, control circuitry 22 may write nine different test servo patterns using nine unique combinations of three different levels of laser current level and three different lengths of preamble. The preceding examples using three different levels of laser current are not limiting, and other numbers of different levels of laser current may be used in implementations. Similarly, the preceding examples using three different lengths of preamble are not limiting, and other numbers of different lengths of preamble may be used in implementations.

In embodiments, analyzing the plurality of test servo patterns for mode hop comprises performing one or more of various methods of mode hop detection in the test servo patterns, particularly in the burst pattern regions of the test servo patterns. In one example, control circuitry 22 detects the presence or absence of mode hop in a burst pattern of a test servo pattern using DC bi-modal analysis. In another example, control circuitry 22 detects the presence or absence of mode hop in a burst pattern of a test servo pattern by comparing amplitudes of respective ones of the bursts in the burst pattern of the test servo pattern, referred to herein as burst amplitude analysis.

In embodiments, control circuitry 22 ranks the plurality of test servo patterns based on the detected presence or absence of mode hop in regions of the test servo patterns that correspond to the burst pattern in the final servo patterns. For example, control circuitry 22 may rank the test servo patterns based on factors that correlate to avoiding mode hop, or minimizing the effect of mode hop, in a region corresponding to the burst pattern of the final servo patterns. These factors may include but are not limited to: absence of mode hop detected in the test servo pattern; location of mode hop detected in the test servo pattern (i.e., in a region corresponding to the burst pattern of the final servo patterns, in a region adjacent to the region corresponding to the burst pattern of the final servo patterns, or in a region not adjacent to the region corresponding to the burst pattern of the final servo patterns); and magnitude of effect of mode hop detected in the test servo pattern. For example, a test servo pattern having no detected mode hop may be ranked higher than a test servo pattern having a detected mode hop. In another example, a test servo pattern having a mode hop detected outside a region corresponding to the burst pattern of the final servo patterns may be ranked higher than a test servo pattern having a mode hop detected inside a region corresponding to the burst pattern of the final servo patterns. In another example, a test servo pattern having a relatively low magnitude mode hop detected inside a region may be ranked higher than a test servo pattern having a relatively high magnitude mode hop detected inside the same region. These examples are not limiting, and other ranking rules and/or algorithms may be used to rank the plurality of test servo patterns based on the mode hop analysis. In this manner, control circuitry 22 may rank the plurality of test servo patterns based on the mode hop analysis of the test servo patterns, and control circuitry 22 may select the write settings used with the highest ranked one of the test servo patterns as the optimal write setting to use when writing a next set of final servo patterns.

In embodiments, control circuitry 22 performs the writing of the plurality test servo patterns, the selecting one of the write settings of the plurality test servo patterns, and the writing a plurality of final servo patterns using the selected one of the write settings in intervals during a servo writing process of the disk. For example, control circuitry 22 may perform these steps at a predefined interval, such as once every 500 tracks on the disk. For example, control circuitry 22 may select write settings (i.e., based on writing test servo patterns and analyzing the test servo patterns for mode hop) and use the selected write settings when writing the final servo patterns in the next 500 tracks of the disk. After writing the final servo patterns in the 500 tracks of the previous interval, control circuitry 22 may repeat the process for the next interval, i.e., by selecting new write settings (i.e., based on writing another plurality of test servo patterns and analyzing those test servo patterns for mode hop) and using the newly selected write settings when writing the final servo patterns in the next 500 tracks of the disk. In this manner, control circuitry 22 may use a relatively small number of test servo patterns (e.g., three to nine) to select write settings for each interval of a relatively large number of tracks of the disk (e.g., 500). The predefined interval is not limited to 500 tracks, and other intervals may be used such as 1000 tracks, 10,000 tracks, etc.

Figure 5A:
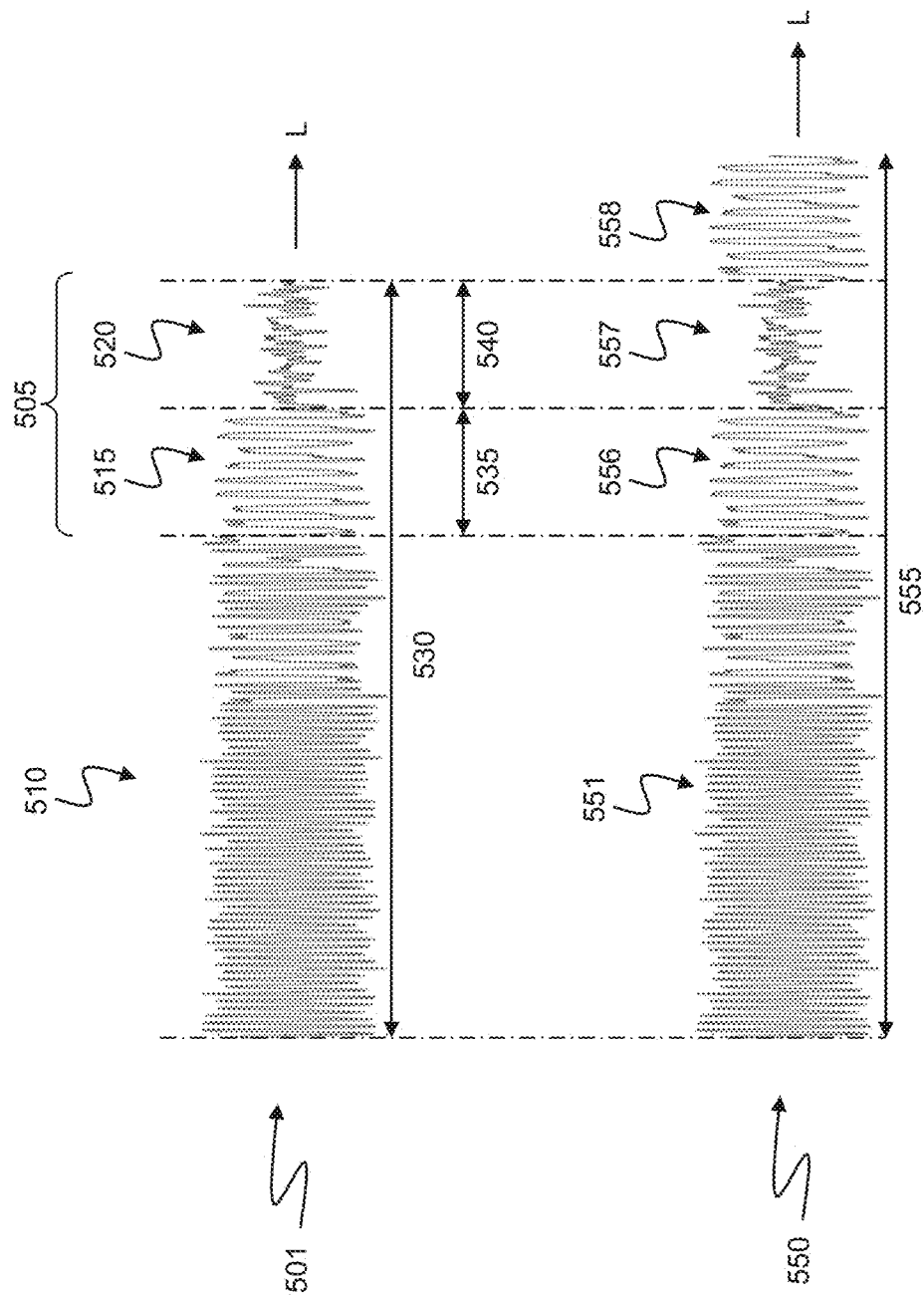
FIGS. 5A-5D show examples of different test servo patterns that may be used in implementations of the present disclosure.

FIGS. 5A-5D show examples of different test servo patterns 550, 560, 570, and 580 that may be used in implementations of the present disclosure. In particular, FIG. 5A shows a servo pattern 501 and a first exemplary test servo pattern 550 in accordance with aspects of the present disclosure. In embodiments, servo pattern 501 includes a region 510 that includes a preamble, servo address mark (SAM) or servo index mark (SIM), and gray coded track information, similar to block 310 of FIG. 3. In embodiments, servo pattern 501 includes a burst pattern 505 that includes a P burst 515 and a Q burst 520, similar to block 305 of FIG. 3. As shown in FIG. 5A, servo pattern 501 has a length 530, P burst 515 has a length 535, and Q burst 520 has a length 540, all in a longitudinal direction "L" of a track containing servo pattern 501. Lengths 530, 535, and 540 may be predefined, such that control circuitry 22 may write multiple instances of final servo patterns having lengths 530, 535, and 540 in respective servo wedges 32 of disk 16.

With continued reference to FIG. 5A, first exemplary test servo pattern 550 includes region 551, $P_1$ burst 556, and Q burst 557 that correspond, respectively, to region 510, P burst 515, and Q burst 520 of servo pattern 501. In embodiments, first exemplary test servo pattern 550 also includes $P_2$ burst 558 at a down-track location relative to Q burst 557, resulting in length 555 of first exemplary test servo pattern 550 being greater than length 530 of servo pattern 501. In accordance with aspects of the present disclosure, control circuitry 22 may write plural different instances of first exemplary test servo pattern 550 using different write settings (i.e., different levels of laser current) and analyze each of the plural different instances of first exemplary test servo pattern 550 for mode hop. In one example, for each of the plural different instances of first exemplary test servo pattern 550, control circuitry 22 may determine whether mode hop occurs in either of the burst pairs ($P_1$ burst 556, Q burst 557) and (Q burst 557, $P_2$ burst 558) using DC bi-modal analysis. In another example, for each of the plural different instances of first exemplary test servo pattern 550, control circuitry 22 may determine whether mode hop occurs in any of the individual bursts $P_1$ burst 556, Q burst 557, and $P_2$ burst 558 using burst amplitude analysis. In embodiments, control circuitry 22 selects an optimal one of the different write settings based on the mode hop analysis, i.e., based on a highest ranked one of the plural different instances of first exemplary test servo pattern 550. As described herein, the rankings may be based on factors that correlate to avoiding mode hop or minimizing the effect of mode hop in a region corresponding to burst pattern 505 of servo pattern 501. In embodiments, control circuitry 22 writes plural instances of final servo patterns using the selected write settings.

Figure 5B:
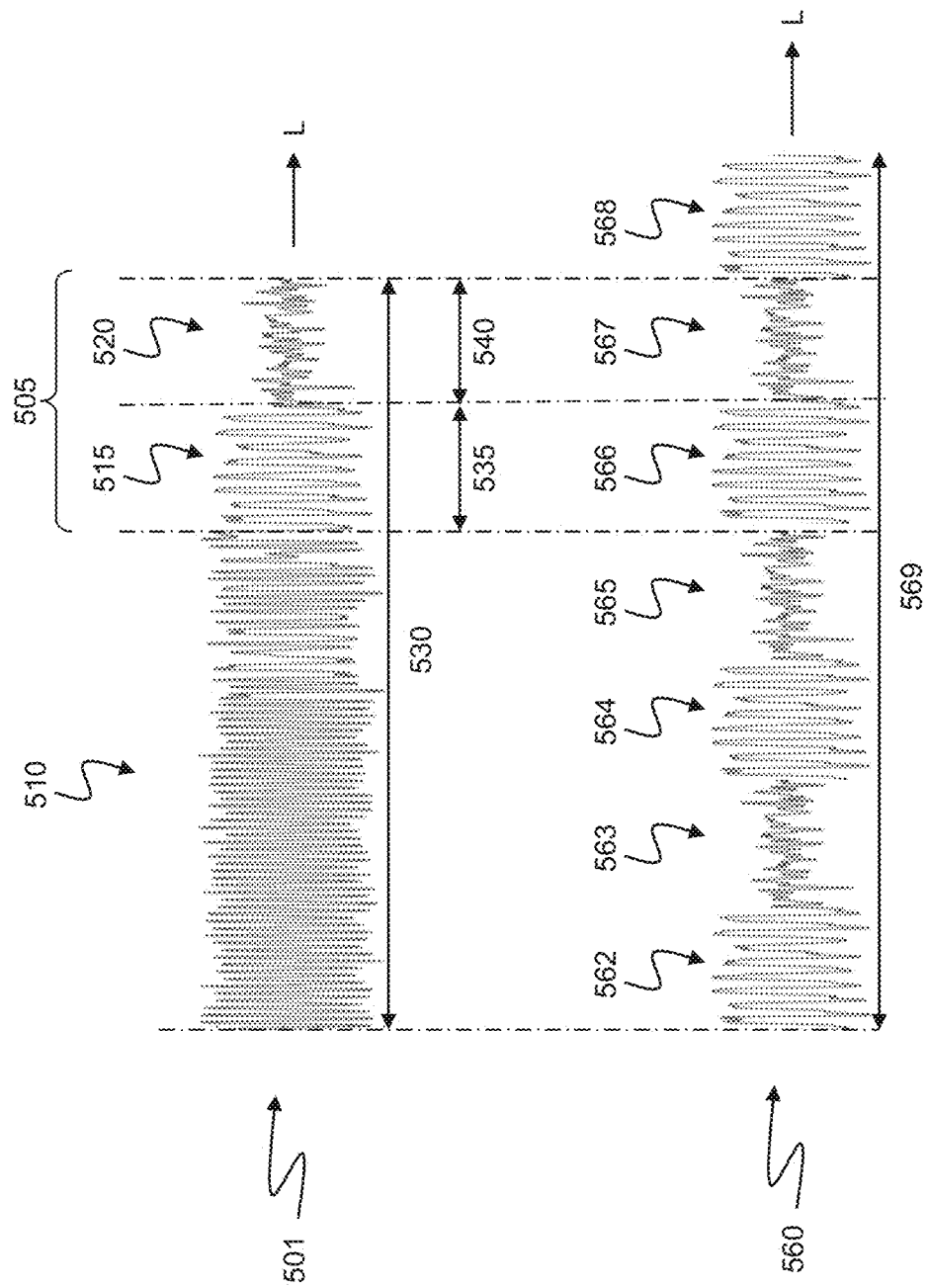

FIG. 5B shows servo pattern 501 and a second exemplary test servo pattern 560 in accordance with aspects of the present disclosure. In embodiments, second exemplary test servo pattern 560 includes $P_1$ burst 562, $Q_1$ burst 563, $P_2$ burst 564, $Q_2$ burst 565, $P_3$ burst 566, $Q_3$ burst 567, and $P_4$ burst 568. Second exemplary test servo pattern 560 has a length 569 that is greater than length 530 of servo pattern 501. In accordance with aspects of the present disclosure, control circuitry 22 may write plural different instances of second exemplary test servo pattern 560 using different write settings (i.e., different levels of laser current) and analyze each of the plural different instances of second exemplary test servo pattern 560 for mode hop. In one example, for each of the plural different instances of second exemplary test servo pattern 560, control circuitry 22 may determine whether mode hop occurs in any of the burst pairs ($P_1$ burst 562, $Q_1$ burst 563), ($Q_1$ burst 563, $P_2$ burst 564), ($P_2$ burst 564, $Q_2$ burst 565), ($Q_2$ burst 565, $P_3$ burst 566), ($P_3$ burst 566, $Q_3$ burst 567), and ($Q_3$ burst 567, $P_4$ burst 568) using DC bi-modal analysis. In another example, for each of the plural different instances of second exemplary test servo pattern 560, control circuitry 22 may determine whether mode hop occurs in any of the individual bursts $P_1$ burst 562, $Q_1$ burst 563, $P_2$ burst 564, $Q_2$ burst 565, $P_3$ burst 566, $Q_3$ burst 567, and $P_4$ burst 568 using burst amplitude analysis. In embodiments, control circuitry 22 selects an optimal one of the different write settings based on the mode hop analysis, i.e., based on a highest ranked one of the plural different instances of second exemplary test servo pattern 560, and writes plural instances of final servo patterns using the selected write settings.

Figure 5C:
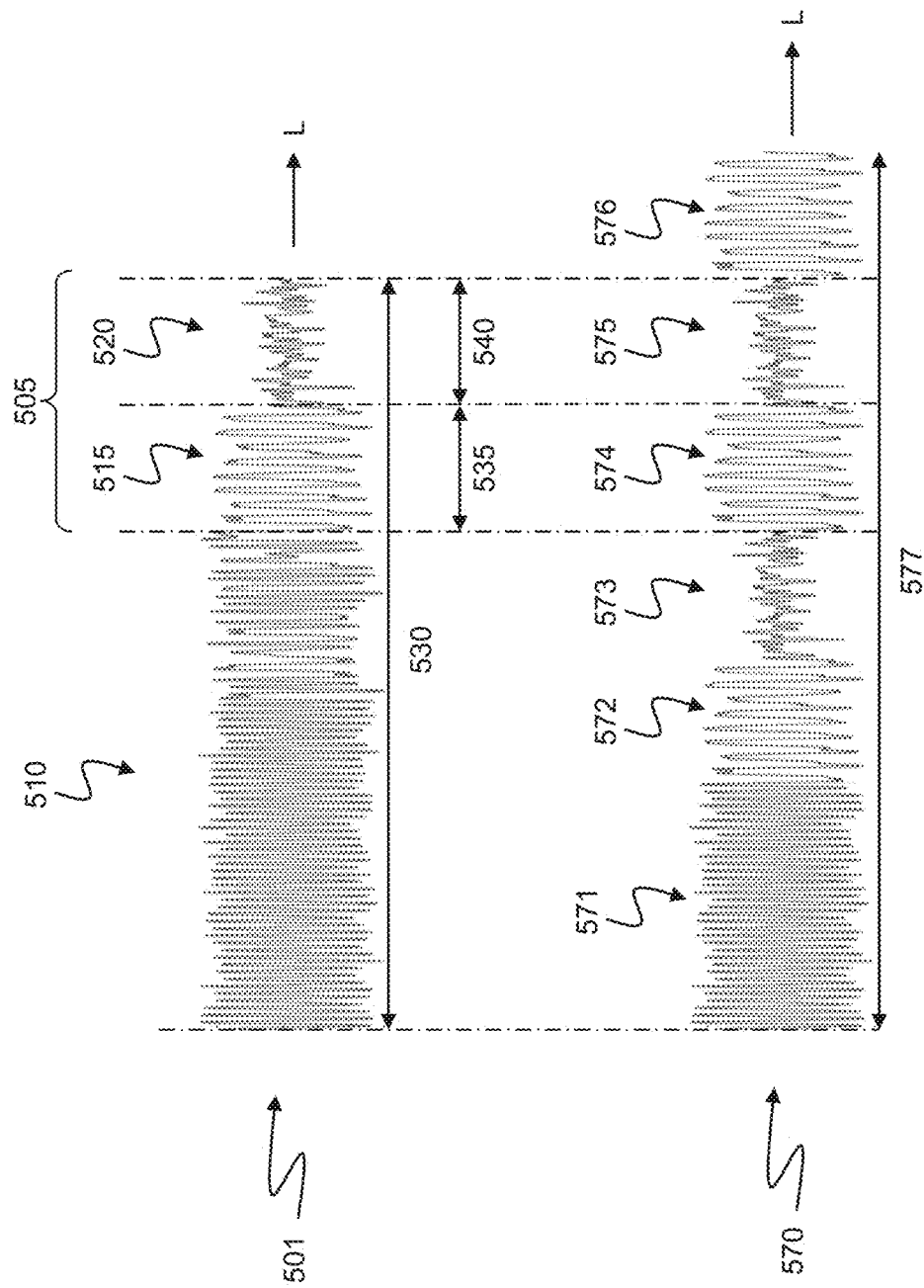

FIG. 5C shows servo pattern 501 and a third exemplary test servo pattern 570 in accordance with aspects of the present disclosure. In embodiments, third exemplary test servo pattern 570 includes region 571, $P_1$ burst 572, $Q_1$ burst 573, $P_2$ burst 574, $Q_2$ burst 575, and $P_3$ burst 576. In embodiments, region 571 corresponds to a shortened preamble. Third exemplary test servo pattern 570 has a length 577 that is greater than length 530 of servo pattern 501. In accordance with aspects of the present disclosure, control circuitry 22 may write plural different instances of third exemplary test servo pattern 570 using different write settings (i.e., different levels of laser current) and analyze each of the plural different instances of third exemplary test servo pattern 570 for mode hop. In one example, for each of the plural different instances of third exemplary test servo pattern 570, control circuitry 22 may determine whether mode hop occurs in any of the burst pairs ($P_1$ burst 572, $Q_1$ burst 573), ($Q_1$ burst 573, $P_2$ burst 574), ($P_2$ burst 574, $Q_2$ burst 575), and ($Q_2$ burst 575, $P_3$ burst 576) using DC bi-modal analysis. In another example, for each of the plural different instances of third exemplary test servo pattern 570, control circuitry 22 may determine whether mode hop occurs in any of the individual bursts $P_1$ burst 572, $Q_1$ burst 573, $P_2$ burst 574, $Q_2$ burst 575, and $P_3$ burst 576 using burst amplitude analysis. In embodiments, control circuitry 22 selects an optimal one of the different write settings based on the mode hop analysis, i.e., based on a highest ranked one of the plural different instances of third exemplary test servo pattern 570, and writes plural instances of final servo patterns using the selected write settings.

Figure 5D:
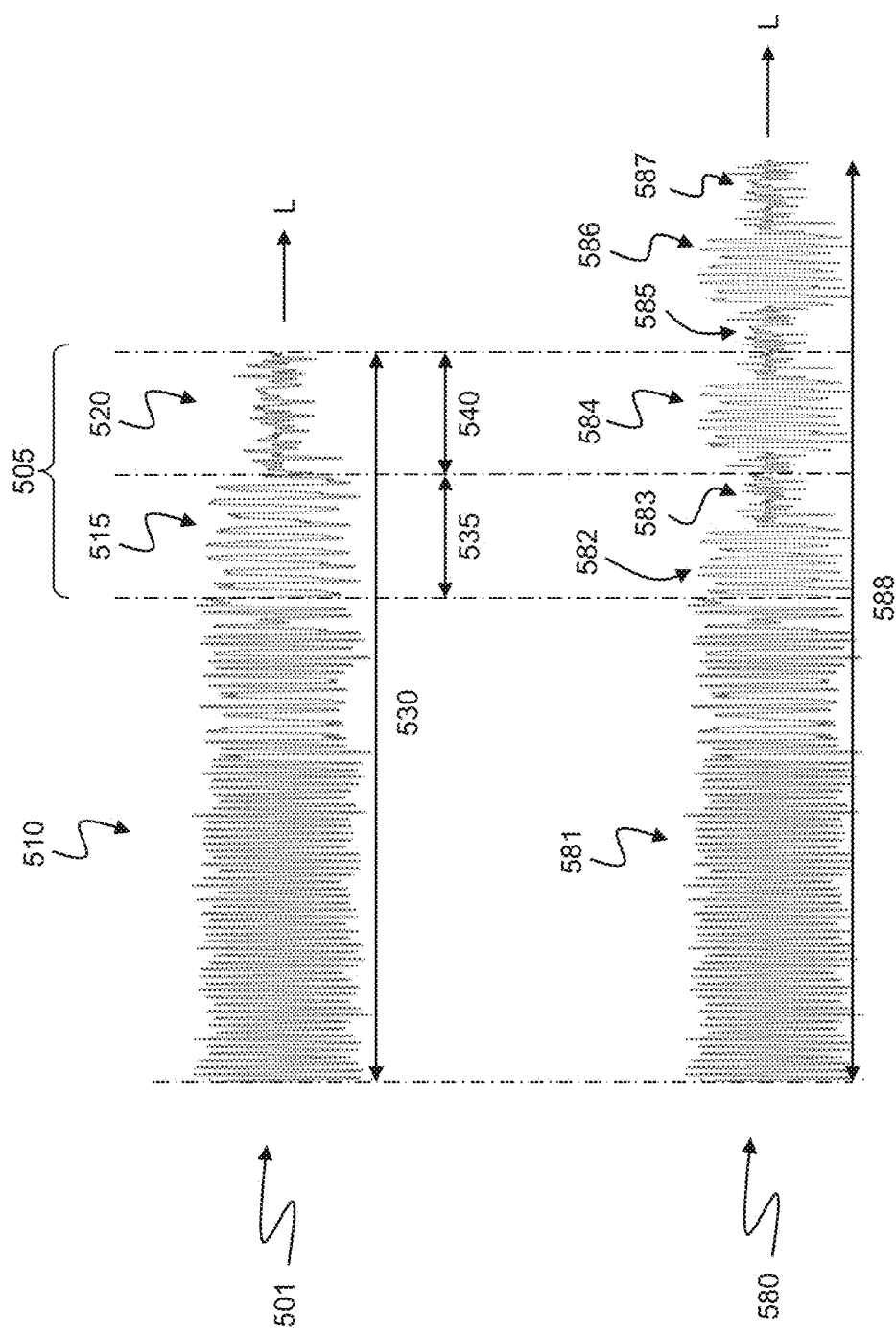

FIG. 5D shows servo pattern 501 and a fourth exemplary test servo pattern 580 in accordance with aspects of the present disclosure. In embodiments, fourth exemplary test servo pattern 580 includes region 581, $P_1$ burst 582, $Q_1$ burst 583, $P_2$ burst 584, $Q_2$ burst 585, $P_3$ burst 586, and $Q_3$ burst 587. In embodiments, region 581 corresponds to region 510, and each of bursts 582-587 has an individual length that is less than the individual lengths of bursts 515 and 520 of servo pattern 501. Fourth exemplary test servo pattern 580 has a length 588 that is greater than length 530 of servo pattern 501. In accordance with aspects of the present disclosure, control circuitry 22 may write plural different instances of fourth exemplary test servo pattern 580 using different write settings (i.e., different levels of laser current) and analyze each of the plural different instances of fourth exemplary test servo pattern 580 for mode hop. In one example, for each of the plural different instances of fourth exemplary test servo pattern 580, control circuitry 22 may determine whether mode hop occurs in any of the burst pairs ($P_1$ burst 582, $Q_1$ burst 583), ($Q_1$ burst 583, $P_2$ burst 584), ($P_2$ burst 584, $Q_2$ burst 585), ($Q_2$ burst 585, $P_3$ burst 586), and ($P_3$ burst 586, $Q_3$ burst 587) using DC bi-modal analysis. In another example, for each of the plural different instances of fourth exemplary test servo pattern 580, control circuitry 22 may determine whether mode hop occurs in any of the individual bursts $P_1$ burst 582, $Q_1$ burst 583, $P_2$ burst 584, $Q_2$ burst 585, $P_3$ burst 586, and $Q_3$ burst 587 using burst amplitude analysis. In embodiments, control circuitry 22 selects an optimal one of the different write settings based on the mode hop analysis, i.e., based on a highest ranked one of the plural different instances of fourth exemplary test servo pattern 580, and writes plural instances of final servo patterns using the selected write settings.

The exemplary test servo patterns 550, 560, 570, and 580 are not limiting, and other implementations of test servo patterns having different characteristics may be used, provided that the test servo patterns are capable of being analyzed to detect writer width change in the relatively short (i.e., 0.1 to 0.2 microseconds) region corresponding to the burst pattern of the servo pattern 501. Characteristics that may be varied in different implementations of test servo patterns include but are not limited to: isolated tracks; preamble length of the test servo pattern; gray code length of the test servo pattern; number of bursts included in the test servo pattern; and frequency of the test servo pattern. For example, when servo pattern 501 has a half rate burst, a test servo pattern may have a half rate burst, a full rate burst, or another burst frequency.

FIG. 5E shows an example of writing a plurality of different instances of one of the implementations of a test servo pattern with different length preambles in accordance with aspects of the present disclosure. In particular, FIG. 5E shows servo pattern 501 and different instances of first exemplary test servo pattern 550, 550' and 550". Servo pattern 501 and first exemplary test servo pattern 550 are the same as those shown in FIG. 5A. In embodiments, first exemplary test servo pattern 550 includes a preamble 589 having a first length 591 that is equal to a length 590 of a preamble included in region 510 of servo pattern 501. In embodiments, second exemplary test servo pattern 550' and third exemplary test servo pattern 550" are each arranged in a same manner as first exemplary test servo pattern 550, except that preamble 589' of the second exemplary test servo pattern 550' has a second length 592 that is less than first length 591, and preamble 589" of the third exemplary test servo pattern 550" has a third length 593 that is greater than first length 591. In embodiments, second length 592 is a minimum preamble length defined by a servo system of disk drive 15, and first length 591 is a standard (or nominal) length of a preamble defined by the servo system of disk drive 15. In embodiments, control circuitry 22 writes each of first exemplary test servo patterns 550, 550' and 550" with their respective sync marks (i.e., servo address mark (SAM)) aligned as shown at line 594.

With continued reference to FIG. 5E, in accordance with aspects of the present disclosure, control circuitry 22 may write each of first exemplary test servo patterns 550, 550' and 550" using a same level of laser current and analyze each of the test servo patterns for mode hop. In one example, for each of first exemplary test servo patterns 550, 550' and 550", control circuitry 22 may determine whether mode hop occurs in either of the burst pairs ($P_1$ burst 556, $Q_1$ burst 557) and ($Q_1$ burst 557, $P_2$ burst 558) using DC bi-modal analysis. In another example, for each of first exemplary test servo patterns 550, 550' and 550", control circuitry 22 may determine whether mode hop occurs in any of the individual bursts $P_1$ burst 556, $Q_1$ burst 557, and $P_2$ burst 558 using burst amplitude analysis. In embodiments, control circuitry 22 selects an optimal one of the different write settings (i.e., one of first length 591, second length 592, or third length 593) based on the mode hop analysis, i.e., based on a highest ranked one of first exemplary test servo patterns 550, 550' and 550", and writes plural instances of final servo patterns using the selected write settings.

With continued reference to FIG. 5E, in accordance with additional aspects of the present disclosure, control circuitry 22 may write plural different instances of each of first exemplary test servo patterns 550, 550' and 550" using different levels of laser current. For example, control circuitry 22 may write a first instance of first exemplary test servo pattern 550 using a first level of laser current, a second instance of first exemplary test servo pattern 550 using a second level of laser current greater than the first level, and a third instance of first exemplary test servo pattern 550 using a third level of laser current greater than the second level. Similarly, control circuitry 22 may write three different instances of first exemplary test servo pattern 550' using the same three different levels of laser current, and control circuitry 22 may write three different instances of first exemplary test servo pattern 550" using the same three different levels of laser current. In this manner, control circuitry 22 may write a total of nine test servo patterns each having different write settings, i.e., each having a different combination of preamble length and level of laser current. Control circuitry 22 may analyze the nine test servo patterns for mode hop in the manner described herein, select one of the nine different write settings based on this analysis, and write a plurality of final servo patterns using the selected write settings.

Using different write settings comprising different length preambles as described in FIG. 5E is not limited to use with first exemplary test servo pattern 550, and instead can be used with other test servo patterns. Similarly, using different write settings comprising different length preambles and different levels of laser current as described in FIG. 5E is not limited to use with first exemplary test servo pattern 550, and instead can be used with other test servo patterns. In various embodiments, when using different write settings comprising different length preambles and different levels of laser current, control circuitry 22 adjusts a laser pre-bias of each test servo pattern to maintain an average magnitude of laser-generated heat on a per revolution basis.

Figure 6:
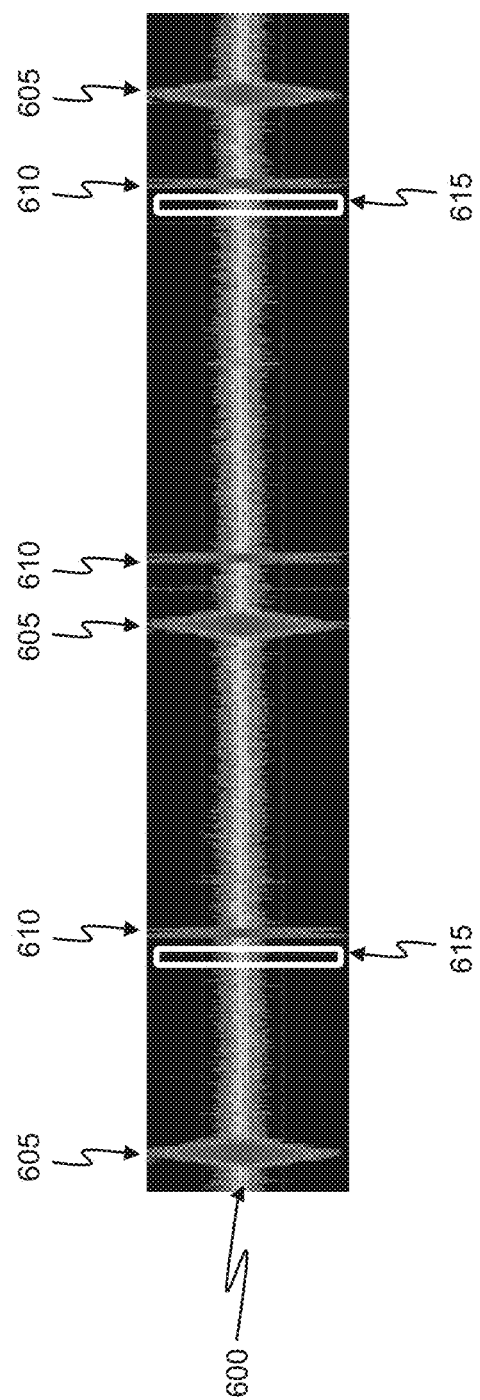
FIG. 6 shows exemplary locations for writing test servo patterns in accordance with aspects of the present disclosure.

FIG. 6 shows exemplary locations for writing test servo patterns in accordance with aspects of the present disclosure. FIG. 6 shows a portion of a track 600 on a disk surface such as disk surface 17A of FIG. 2A. Track 600 may be one of thousands of concentric tracks on the disk surface, each divided up into multiple sectors. As shown in FIG. 6, one or more spiral servo tracks 605 may intersect track 600 at defined locations on the disk surface. As is understood in the art, spiral servo tracks 605 may be written to the disk and then used as a reference in a self-servo writing operation that includes writing the final servo patterns (also called product servo patterns) in concentric servo sectors 610 (also referred to herein as servo wedges).

According to an aspect of the present disclosure, when writing a plurality of test servo patterns (such as test servo patterns 550, 560, 570, and 580 described herein) for an interval of the disk, control circuitry 22 may write the test servo patterns as sacrificial patterns in concentric servo sectors of a track, such as concentric servo sectors 610 of track 600. In these implementations, after analyzing the plurality of test servo patterns for mode hop and selecting an optimal write setting, as described herein, control circuitry 22 may write one or more of the final servo patterns using the selected write setting in the same concentric servo sectors as the previously written test servo patterns. In this manner, control circuitry 22 overwrites the previously written test servo patterns with ones of the final servo patterns. In various embodiments according to this aspect, a test servo pattern may be longer than the concentric servo sector in which the test servo pattern is written (i.e., in the longitudinal direction of the track), such that the test servo pattern is partially written in a data sector preceding the concentric servo sector and/or a data sector following the concentric servo sector. In these embodiments, control circuitry 22 may overwrite the portion of the test servo pattern in the concentric servo sector with a final servo pattern, and control circuitry 22 may subsequently overwrite the portion(s) of the test servo pattern in the data sector(s) with data.

According to another aspect of the present disclosure, when writing a plurality of test servo patterns (such as test servo patterns 550, 560, 570, and 580 described herein) for an interval of the disk, control circuitry 22 may write the test servo patterns as sacrificial patterns in regions 615 of data sectors of a track. In embodiments, the regions 615 immediately precede concentric servo sectors of the track (such as concentric servo sectors 610 of track 600), so that drive conditions that exist during the writing the test servo patterns are similar to the drive conditions that exist when writing the final servo patterns. In embodiments, the regions 615 do not coincide with spiral servo tracks 605, so as not to interfere with the functioning of the spiral servo tracks 605. In implementations according to this aspect, after analyzing the plurality of test servo patterns for mode hop and selecting an optimal write setting, as described herein, control circuitry 22 may write one or more of the final servo patterns using the selected write setting in the concentric servo sectors, and control circuitry 22 may subsequently overwrite the test servo pattern in the regions 615 with data. In implementations according to this aspect, and as shown in FIG. 6, control circuitry 22 does not write test servo patterns in regions 615 preceding every concentric servo sector 610, since embodiments as described herein may use far fewer test servo patterns than final servo patterns. In some embodiments according to this aspect, the test servo patterns written in data sectors may include a preamble and bursts but are devoid of SAM and gray code, so as not to interfere with the self-servo writing operation of the disk.

With continued reference to FIG. 6, and according to another aspect of the present disclosure, the test servo patterns are not sacrificial and may be used as final servo patterns. In implementations of this aspect, control circuitry 22 writes the test servo patterns in the concentric servo sectors of a track, such as concentric servo sectors 610 of track 600. In these implementations, control circuitry 22 dithers (or perturbs) the laser current used to write the test servo patterns, i.e., to provide different write settings including different levels of laser current for different ones of the test servo patterns. In embodiments, the different levels of laser current may correspond to different levels of laser pre-bias, different levels of laser current used when writing the test servo patterns, or both. In these implementations, after analyzing the plurality of test servo patterns for mode hop and selecting an optimal write setting, as described herein, control circuitry 22 may write other final servo patterns using the selected write setting in other concentric servo sectors, but not in the same concentric servo sectors as the previously written test servo patterns. In this manner, control circuitry 22 avoids overwriting the previously written test servo patterns with ones of the final servo patterns. In embodiments according to this aspect, the test servo patterns include the same types of servo information as a final servo pattern, including a preamble, SAM or SIM, gray code, and null burst pattern. In embodiments according to this aspect, because there are so few test servo patterns compared to other final servo patterns, any burst pattern distortion that occurs in the few test servo patterns appears to the servo system as high frequency noise rather than DC squeeze, and control circuitry 22 handles this distortion using wedge repeatable runout (WRRO) learning. In embodiments according to this aspect, the test servo patterns may include one or more extra bursts following the null burst pattern. These one or more extra bursts may be written in the data sector following the concentric servo sector in which the test servo pattern is written, and these one or more extra bursts may be subsequently overwritten with data.

Figure 7:
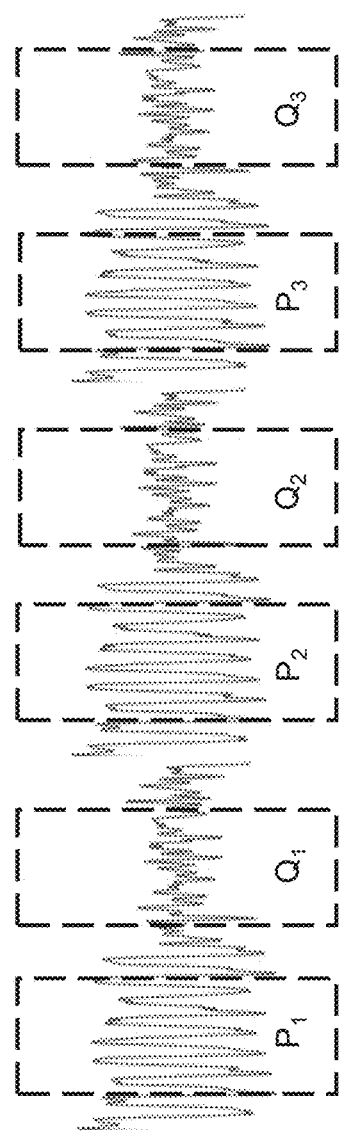
FIG. 7 shows an example of analyzing a test servo pattern for mode hop using burst amplitude analysis in accordance with aspects of the present disclosure.

FIG. 7 shows an example of analyzing a test servo pattern for mode hop using burst amplitude analysis in accordance with aspects of the present disclosure. In embodiments, burst amplitude analysis comprises control circuitry 22 reading first values (i.e., read signal magnitudes) of plural P bursts (i.e., $P_1$, $P_2$, and $P_3$ in FIG. 7) and first values of plural Q bursts (i.e., $Q_1$, $Q_2$, and $Q_3$ in FIG. 7) at first track locations within a test servo pattern. In embodiments, burst amplitude analysis further comprises control circuitry 22 reading second values of the same plural P bursts and second values of the same plural Q bursts at second track locations within the test servo pattern. In one example, the second track locations are a half-track away from the first track locations. In embodiments, burst amplitude analysis further comprises control circuitry 22 determining a first P value based on the first values of plural P bursts, a second P value based on the second values of plural P bursts, a first Q value based on the first values of plural Q bursts, and a second Q value based on the second values of plural Q bursts. In one example, control circuitry 22 determines the first P value by summing the first values of plural P bursts, control circuitry 22 determines the second P value by summing the second values of plural P bursts, control circuitry 22 determines the first Q value by summing the first values of plural Q bursts, and control circuitry 22 determines the second Q value by summing the second values of plural Q bursts.

With continued reference to FIG. 7, and in accordance with aspects of the present disclosure, control circuitry 22 determines whether mode hop occurred in any of the P bursts by comparing a difference between the first P value and the second P value to a threshold value. In embodiments, the threshold value is set above a noise impact in the bursts. In embodiments, control circuitry 22 determines that mode hop occurred in one of the P bursts of the test servo pattern based on the difference between the first P value and the second P value being greater than the threshold value, and control circuitry 22 determines that mode hop did not occur in any of the P bursts of the test servo pattern based on the difference between the first P value and the second P value being less than the threshold value. Similarly, control circuitry 22 determines that mode hop occurred in one of the Q bursts of the test servo pattern based on the difference between the first Q value and the second Q value being greater than the threshold value, and control circuitry 22 determines that mode hop did not occur in any of the Q bursts of the test servo pattern based on the difference between the first Q value and the second Q value being less than the threshold value. In embodiments, in response to determining that mode hop occurred in one of the P bursts or one of the Q bursts, control circuitry 22 may identify which specific one of the bursts the mode hope occurred in by comparing differences in values of pairs of the individual bursts, thereby determining which individual one of the burst has a value that is an outlier compared to the values of other ones of the bursts of that type. In this manner, control circuitry 22 may use burst amplitude analysis to determine whether mode hop occurred in the bursts of the test servo pattern and, if so, the individual burst in which the mode hop occurred.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
    one or more disks;
    an actuating mechanism comprising one or more heads, and configured to position the one or more heads proximate to disk surfaces of the one or more disks; and
    one or more processing devices, individually or in combination, configured to:
        write a plurality of test servo patterns using a plurality of different write settings;
        select one of the plurality of different write settings based on analyzing the plurality of test servo patterns for mode hop; and
        write a plurality of final servo patterns using the selected one of the plurality of different write settings.

2. The data storage device of claim 1, wherein the plurality of different write settings comprise different levels of laser current used when writing the plurality of test servo patterns.

3. The data storage device of claim 1, wherein the plurality of different write settings comprise different preamble lengths in the plurality of test servo patterns.

4. The data storage device of claim 1, wherein the plurality of different write settings comprise different levels of laser current used when writing the plurality of test servo patterns and different preamble lengths in the plurality of test servo patterns.

5. The data storage device of claim 1, wherein the analyzing the plurality of test servo patterns for mode hop comprises analyzing the plurality of test servo patterns for mode hop in one or more regions that correspond to null burst patterns in the plurality of final servo patterns.

6. The data storage device of claim 1, wherein the analyzing the plurality of test servo patterns for mode hop comprises analyzing the plurality of test servo patterns using DC bi-modal analysis.

7. The data storage device of claim 1, wherein the analyzing the plurality of test servo patterns for mode hop comprises analyzing the plurality of test servo patterns using burst amplitude analysis.

8. The data storage device of claim 1, wherein the writing the plurality of test servo patterns comprises writing the plurality of test servo patterns in servo sectors.

9. The data storage device of claim 8, wherein the writing the plurality of final servo patterns comprises overwriting the plurality of test servo patterns.

10. The data storage device of claim 8, wherein:
    the writing the plurality of final servo patterns comprises the writing the plurality of final servo patterns in other servo sectors different than the servo sectors in which the plurality of test servo patterns are written; and
    the one or more processing devices, individually or in combination, are configured to use the plurality of test servo patterns as product servo patterns.

11. The data storage device of claim 1, wherein the writing the plurality of test servo patterns comprises writing the plurality of test servo patterns in data sectors.

12. The data storage device of claim 11, wherein the one or more processing devices, individually or in combination, are configured to overwrite the plurality of test servo patterns with data.

13. The data storage device of claim 1, wherein:
    each of the plurality of final servo patterns comprises a burst pattern comprising two bursts; and
    each of the plurality of test servo patterns comprises a burst pattern comprising at least three bursts.

14. The data storage device of claim 1, wherein the one or more processing devices, individually or in combination, are configured to:
    repeat the writing the plurality of test servo patterns, the selecting one of the plurality of different write settings, and the writing the plurality of final servo patterns at an interval defined by a number of tracks on one of the one or more disks.

15. A method comprising:
    writing a plurality of test servo patterns in a track of a disk using a plurality of different write settings;
    analyzing the plurality of test servo patterns for mode hop;
    selecting one of the plurality of different write settings based on the analyzing the plurality of test servo patterns for mode hop; and
    writing a plurality of final servo patterns in servo sectors in multiple tracks of the disk using the selected one of the plurality of different write settings,
    wherein the writing the plurality of test servo patterns, the analyzing the plurality of test servo patterns, the selecting one of the plurality of different write settings, and the writing the plurality of final servo patterns are performed by one or more processing devices individually or in combination.

16. The method of claim 15, wherein:
    the plurality of different write settings comprise different levels of laser current used when writing the plurality of test servo patterns and/or different preamble lengths in the plurality of test servo patterns; and the analyzing the plurality of test servo patterns for mode hop comprises analyzing the plurality of test servo patterns for mode hop in one or more regions that correspond to null burst patterns in the plurality of final servo patterns.

17. The method of claim 15, further comprising overwriting the plurality of test servo patterns with the plurality of final servo patterns and/or data.

18. One or more processing devices comprising:

means for writing a plurality of test servo patterns in a track of a disk using a plurality of different write settings;

means for selecting one of the plurality of different write settings based on analyzing the plurality of test servo patterns for mode hop; and means for writing a plurality of final servo patterns in servo sectors in multiple tracks of the disk using the selected one of the plurality of different write settings.

19. The one or more processing devices of claim 18, wherein the analyzing the plurality of test servo patterns for mode hop comprises analyzing the plurality of test servo patterns, using DC bi-modal analysis or burst amplitude analysis, for mode hop in one or more regions that correspond to null burst patterns in the plurality of final servo patterns.

20. The one or more processing devices of claim 18, wherein:

the plurality of different write settings comprise different levels of laser current used when writing the plurality of test servo patterns and/or different preamble lengths in the plurality of test servo patterns;

the plurality of test servo patterns are overwritten with the plurality of final servo patterns and/or data; and the plurality of test servo patterns comprise half rate bursts or full rate bursts.

* * * * *